(12) United States Patent
Jie et al.

(10) Patent No.: US 10,963,121 B2
(45) Date of Patent: Mar. 30, 2021

(54) INFORMATION DISPLAY METHOD, APPARATUS AND MOBILE TERMINAL

(71) Applicant: GUANGDONG OPPO MOBILE TELECOMMUNICATIONS CORP., LTD., Guangdong (CN)

(72) Inventors: Junren Jie, Guangdong (CN); Jifeng Tan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/275,588

(22) Filed: Feb. 14, 2019

(65) Prior Publication Data

US 2019/0369813 A1 Dec. 5, 2019

(30) Foreign Application Priority Data

May 29, 2018 (CN) .......................... 201810534121.1

(51) Int. Cl.
*G06F 3/048* (2013.01)
*G06F 3/0481* (2013.01)
*G06F 3/041* (2006.01)
*G06F 3/0488* (2013.01)

(52) U.S. Cl.
CPC .......... *G06F 3/0481* (2013.01); *G06F 3/0414* (2013.01); *G06F 3/0488* (2013.01)

(58) Field of Classification Search
CPC .... G06F 3/014; G06F 3/016; G06F 2203/014; G06F 3/0414; G06F 3/0481; G06F 3/0488
See application file for complete search history.

(56) References Cited

U.S. PATENT DOCUMENTS

| 7,710,401 | B2* | 5/2010 | Nagata | .................. | G06F 1/1616 |
| | | | | | 345/169 |
| 9,244,562 | B1 | 1/2016 | Rosenberg et al. | | |
| 9,298,324 | B1 | 3/2016 | Rowe et al. | | |

(Continued)

FOREIGN PATENT DOCUMENTS

| CN | 101118469 A | 2/2008 |
| CN | 104508746 A | 4/2015 |

(Continued)

OTHER PUBLICATIONS

Extended European Search Report dated Sep. 4, 2019.

(Continued)

*Primary Examiner* — Claudia Dragoescu

(57) ABSTRACT

Embodiments of the present disclosure disclose an information display method, an apparatus and a mobile terminal, which relate to the field of mobile terminal technologies. The method includes: receiving a press operation on a preset display content; displaying, based on the press operation, a loading bar representing a magnitude of a force value of the press operation; and loading the loading bar to a preset length when the force value of the press operation reaches a preset threshold, and parsing the preset display content. In this solution, intuitive feedback for the magnitude of the force of the press operation is made through the loading bar, so that the user can know the press process, improving the user experience.

17 Claims, 8 Drawing Sheets

(56) References Cited

U.S. PATENT DOCUMENTS

| | | | | |
|---|---|---|---|---|
| 2007/0245344 | A1* | 10/2007 | Kumagai | G06F 8/65 717/174 |
| 2008/0024459 | A1 | 1/2008 | Poupyrev et al. | |
| 2008/0055272 | A1* | 3/2008 | Anzures | G06F 1/1626 345/173 |
| 2015/0149964 | A1* | 5/2015 | Bernstein | G06F 3/04817 715/836 |
| 2015/0153887 | A1 | 6/2015 | Kim et al. | |
| 2016/0188181 | A1 | 6/2016 | Smith | |

FOREIGN PATENT DOCUMENTS

| | | |
|---|---|---|
| CN | 105045492 A | 11/2015 |
| CN | 105100492 A | 11/2015 |
| CN | 105117131 A | 12/2015 |
| CN | 105183279 A | 12/2015 |
| CN | 105653090 A | 6/2016 |
| CN | 105653099 A | 6/2016 |
| CN | 105653193 A | 6/2016 |
| CN | 105894239 A | 8/2016 |
| CN | 107479749 A | 12/2017 |
| CN | 107608589 A | 1/2018 |
| CN | 107613280 A | 1/2018 |
| CN | 108958621 A | 12/2018 |
| WO | 2017156697 A1 | 9/2017 |

OTHER PUBLICATIONS

International Search Report and Written Opinion dated Jun. 17, 2019; PCT/CN2019/078728.
The First Examination Report of the Priority Application No. 201810534121.2, dated Feb. 6, 2020.
The second Examination Report of the Priority Application No. 201810534121.2, dated Sep. 7, 2020.
First Office Action of the Indian application No. 201914007248, dated Jan. 22, 2021.

* cited by examiner

INFORMATION DISPLAY METHOD, APPARATUS AND MOBILE TERMINAL

CROSS-REFERENCE TO RELATED APPLICATIONS

This application claims priority to Chinese Patent Application No. 201810534121.2, filed on May 29, 2018 and entitled "INFORMATION DISPLAY METHOD, APPARATUS AND MOBILE TERMINAL", which is hereby incorporated by reference in its entirety.

TECHNICAL FIELD

The present disclosure relates to the field of mobile terminal technologies, and in particular, to an information display method, an apparatus, and a mobile terminal.

BACKGROUND

A mobile terminal may display various contents with its display screen, and a user may operate the display contents on the display screen. However, if the user fails to obtain an operation result during the operation on the display contents, it is impossible to know whether the operation is valid or whether the operation is incorrect, causing poor user experience.

SUMMARY

To solve the above problem, the present disclosure provides an information display method, an apparatus, and a mobile terminal, which provide intuitive feedback for a user's operation through a loading bar, thereby improving the user experience.

In a first aspect, an embodiment of the present disclosure provides an information display method, including: receiving a press operation on a preset display content; displaying, based on the press operation, a loading bar representing a magnitude of a force value of the press operation; loading the loading bar to a preset length when the force value of the press operation reaches a preset threshold; and parsing the preset display content.

In a second aspect, an embodiment of the present disclosure provides an information display apparatus, including: a press receiving module, configured to receive a press operation on a preset display content; a display module, configured to display, based on the press operation, a loading bar representing a magnitude of a force value of the press operation; and a processing module, configured to load the loading bar to a preset length when the force value of the press operation reaches a preset threshold and parse the preset display content.

In a third aspect, an embodiment of the present disclosure provides a mobile terminal, including: a display screen, a memory and a processor, where the display screen and the memory are coupled to the processor, and the memory is configured to store instructions; when the instructions are executed by the processor, the processor performs the method described above.

In a fourth aspect, an embodiment of the present disclosure provides a non-transitory computer-readable medium storing computer-executable code for information display, where the program codes is executed by a processor to perform the method described above.

According to the information display method, the apparatus and the mobile terminal provided in the present disclosure, the press operation on the preset display content is received, and the loading bar representing the magnitude of the force value of the press operation is displayed based on the press operation. When the force value of the press operation reaches the preset threshold, the loading bar is loaded to the preset length, and the preset display content is parsed. In this solution, intuitive feedback for the magnitude of the force of the press operation is made through the loading bar, so that the user can know the press process, improving the user experience.

BRIEF DESCRIPTION OF DRAWINGS

In order to illustrate the technical solutions in embodiments of the present disclosure more clearly, accompanying drawings used for description of the embodiments will be briefly described hereunder. Obviously, the following described drawings are merely some embodiments of the present disclosure. For persons skilled in the art, other drawings may be obtained based on these drawings without any creative effort.

DESCRIPTION OF EMBODIMENTS

The technical solutions in embodiments of the present disclosure will be described hereunder clearly and completely with reference to the accompanying drawings in the embodiments of the present disclosure. Obviously, the described embodiments are only a part of embodiments of the present disclosure, rather than all embodiments thereof. All other embodiments obtained by persons of ordinary skill in the art based on the embodiments of the present disclosure without any creative effort shall fall into the protection scope of the present disclosure.

At present, when users chat on line, read text, view pictures or watch videos over a mobile terminal, they often become interested in some of the contents and search for more detailed information. At this time, the users first need to copy the contents of interest or keep in mind the contents of interest, then open a browser and paste the copied contents or enter the contents kept in mind into a search box of the browser to search for detailed information. This makes the operation process cumbersome, and it is time-consuming and prone to errors.

Further, in order to solve the problem of cumbersome search process, more and more mobile terminal begin to identify text by means of force sensing technologies and parse the identified contents, so as to obtain the parsed result, thereby improving the information acquisition speed. However, the inventors have found through a considerable amount of research that when the user presses the contents to be identified, it is not known to what extent can the press enable the parsing of the contents. In addition, even if the user's press reaches the condition to enable the parsing of the contents, if the display of the parsed result is not available, the user cannot determine whether the press is incorrect or the identification fails.

With regard to the above technical problem, the inventors propose the information display method, the apparatus and the mobile terminal provided in embodiments of the present disclosure, according to which the user's press operation is fed back through a loading bar so that the user can learn the press result.

The information display method, the apparatus and the mobile terminal provided in the embodiments of the present disclosure will be described hereunder with reference to the accompanying drawings and through specific embodiments.

Figure 1:
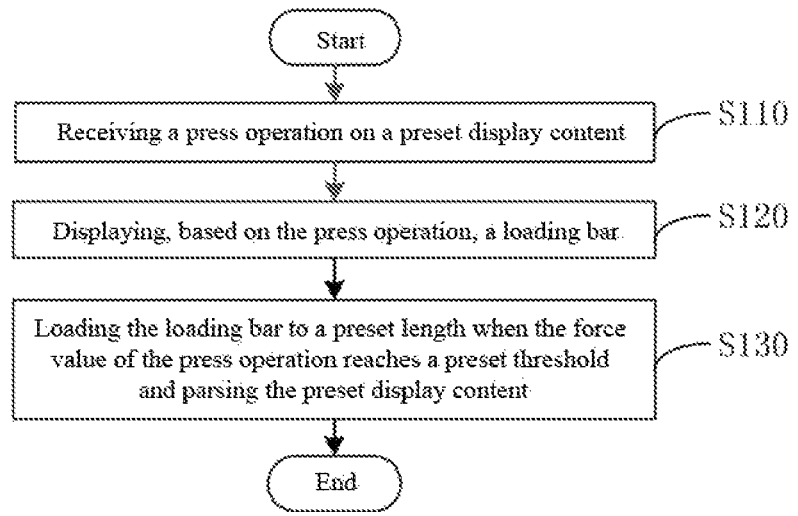
FIG. 1 shows a flow chart of an information display method according to an embodiment of the present disclosure.

FIG. 1. provides an information display method of an embodiment of the present disclosure. The information display method is used to feedback a user's press operation through a loading bar, so that the user can intuitively perceive the press force during the operation. In a specific embodiment, the information display method is applied to an information display apparatus shown in FIG. 12 and a corresponding mobile terminal 400 (FIG. 13 and FIG. 14) having the information display apparatus 300. The above information display method can specifically include the following steps:

Step S110: receiving a press operation on a preset display content.

When the user wants to identify some contents displayed on a display screen and further understand detailed information of the contents, the user can press the contents, that is, pressing the position of the contents on the display screen. The contents that are pressed by the user may be preset display contents. The specific contents of the preset display contents are not limited in the embodiment of the present disclosure, which may be a webpage content, a video content, a chat content, a picture content, and the like, as described above.

The mobile terminal can receive the press operation performed by the user on the display screen.

Step S120: displaying, based on the press operation, a loading bar representing the magnitude of a force value of the press operation.

The display screen of the mobile terminal may be a screen capable of obtaining a force value of a touch operation or a press operation applied thereto, such as a force sensing screen, and the force value of the press operation can be obtained when the press operation applied by the user on the display screen is received.

Therefore, in the case that the mobile terminal receives the press operation at the position of the preset display content on the display screen, the force value of the press operation is obtained. In addition, the magnitude of the force value of the press operation can be represented by the loading bar, and the loading bar is displayed on the display interface. The loading bar is a progress bar indicating the magnitude of the force value. Within a certain range, the larger the force value, the longer the loading bar.

Step S130: loading the loading bar to a preset length when the force value of the press operation reaches a preset threshold and parsing the preset display content.

During the press process, the user may continuously increase the press force, then the displayed loading bar becomes longer gradually. When the force value of the press operation reaches the preset threshold, the loading bar is loaded to the preset length which is a length reached after the loading bar is fully loaded, and the display content starts to be parsed to obtain detailed information of the preset display content through the parsing.

Therefore, when the user wants to identify and press the preset display content, the user can learn, from the change in the length of the loading bar, whether the current press force reaches the condition to parse the preset content. In the case that the length of the loading bar does not reach the preset length, the user can continue increasing the press force through the indication from the loading bar, so that the press force reaches the condition to identify the preset display content, so as to trigger the parsing of the preset display content.

Figure 2:
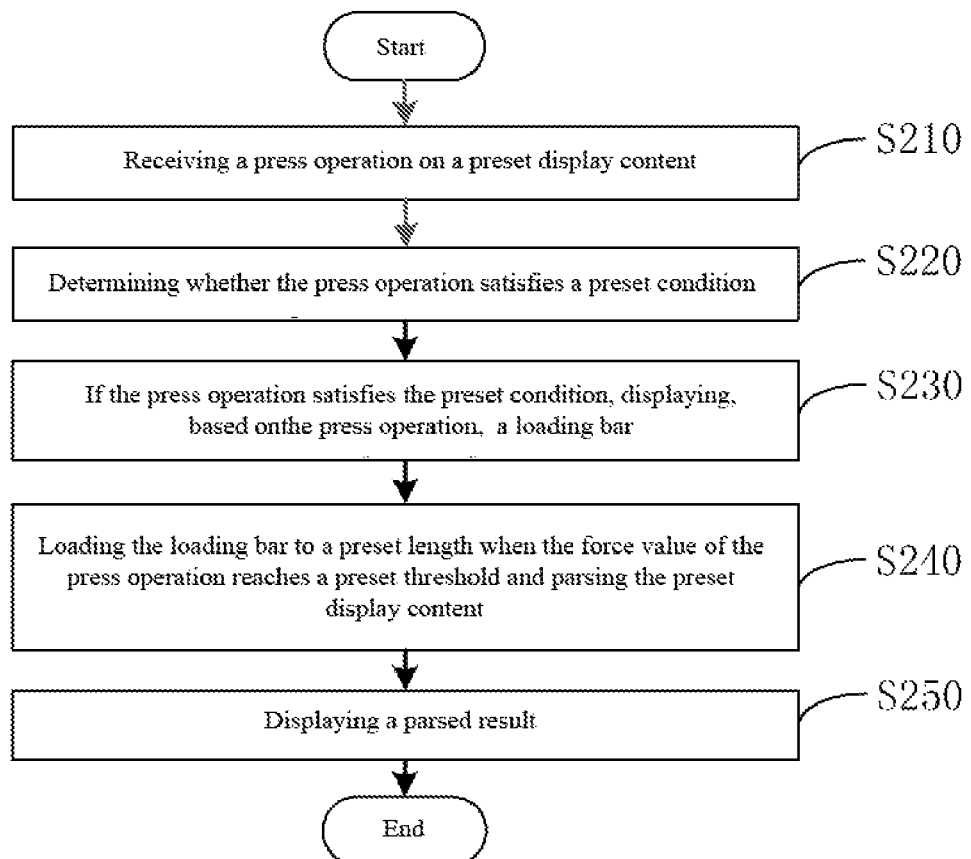
FIG. 2 shows a flow chart of an information display method according to an embodiment of the present disclosure.

An embodiment of the present disclosure provides an information display method, as illustrated in FIG. 2. The method includes:

Step S210: receiving a press operation on a preset display content.

Step S220: determining whether the press operation satisfies a preset condition.

When the press operation on the preset display content is received, in order to avoid an erroneous operation, that is, to avoid erroneously determining a press operation not for identifying the preset display content as the press operation to enable the identification of the preset display content, it can be determined whether the received press operation satisfies the preset condition.

As an implementation, the preset condition may be that the force value of the press operation reaches an enabling force value. That is to say, it is determined whether the force value of the press operation reaches the preset enabling force value. The enabling force value is a preset force threshold and is used as a basic force value required for displaying the loading bar. The enabling force value is not limited in the embodiment of the present disclosure in terms of its specific value, which may be greater than the force value generated when a touch operation is performed on the display screen of the mobile terminal. When the user wants to identify the preset display content, the press force can be appropriately increased for the preset display content in order to distinguish from other touch operations on the preset display content.

As an implementation, since the touch operation on the display content of the mobile terminal is usually an instant touch, the preset condition may also be that the press duration of the press operation reaches a preset press duration, in order to distinguish it from other touch operations on the preset display content. The preset press duration is not limited in the embodiment of the present disclosure in terms of its specific value, for instance, it may be 200 ms.

Step S230: if the press operation satisfies the preset condition, displaying, based on the press operation, a loading bar representing the magnitude of a force value of the press operation.

Step S240: loading the loading bar to a preset length when the force value of the press operation reaches a preset threshold and parsing the preset display content.

Figure 3:
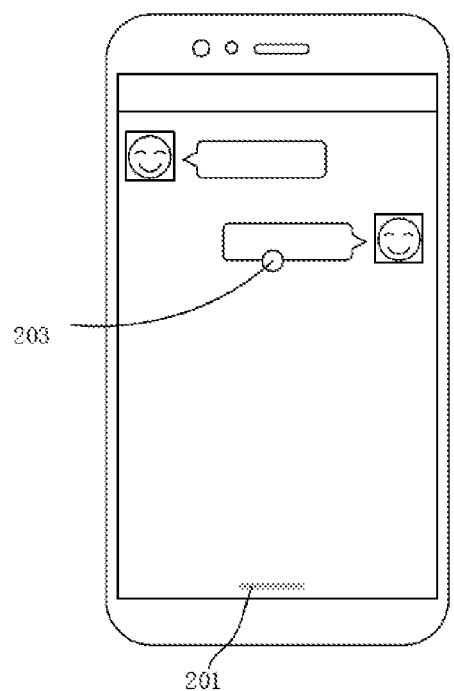
FIG. 3 shows the first display diagram according to an embodiment of the present disclosure.
Figure 4:
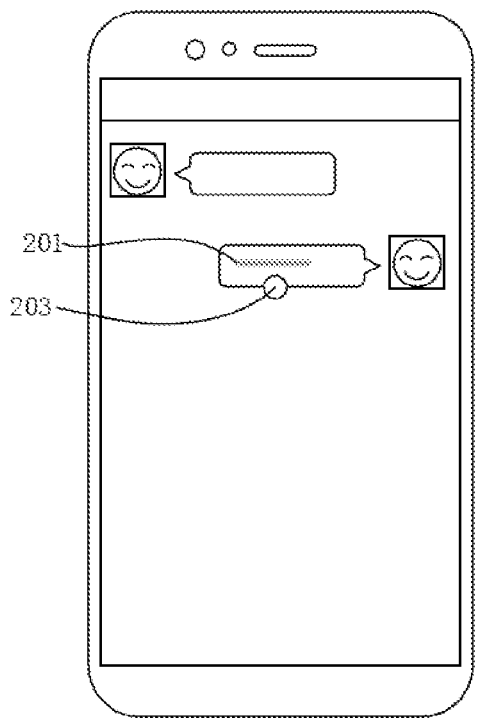
FIG. 4 shows the second display diagram according to an embodiment of the present disclosure.

When the press operation reaches and satisfies the preset condition, the loading bar 201 for making intuitive feedback for the force value of the press operation is displayed, as shown in FIG. 3. The loading bar 201 may be displayed at any position of the display interface, for instance, displayed at the bottom of the display interface as shown in FIG. 3; displayed above a press position 203 as shown in FIG. 4; or displayed below the press position 203, at the top of the display interface, at both sides between the top and bottom of the display interface, etc. The loading bar 201 may be displayed laterally as shown in FIG. 3, or may be displayed in other directions, for instance, displayed longitudinally.

Figure 5:
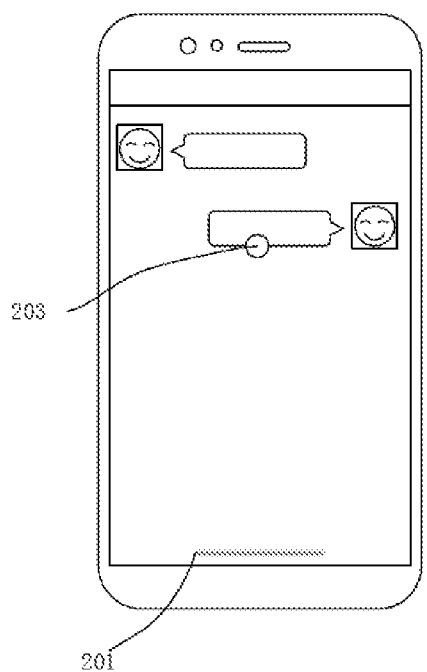
FIG. 5 shows the third display diagram according to an embodiment of the present disclosure.
Figure 6:
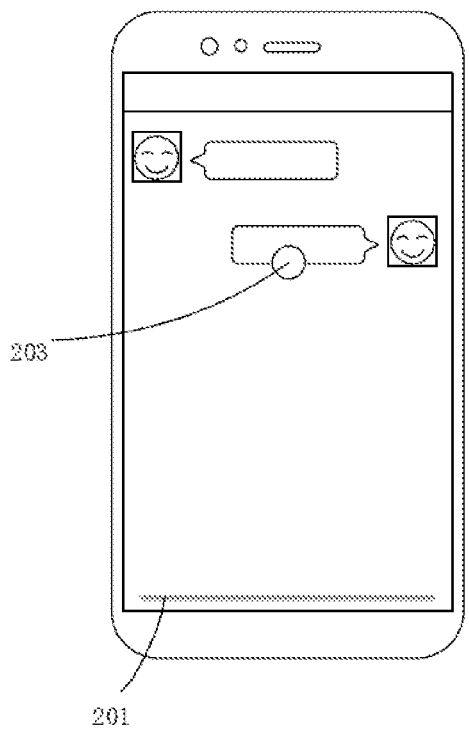
FIG. 6 shows the fourth display diagram according to an embodiment of the present disclosure.

As the force value increases, the loading bar 201 becomes longer gradually. When the force value is increased to the preset threshold, the loading bar 201 is loaded to the preset length. The preset length is a length reached after the loading bar 201 is fully loaded, and when the force value continues increasing, the loading bar 201 does not become longer in length any more. FIG. 3, FIG. 5, and FIG. 6 show schematic diagrams illustrating that the loading bar 201 becomes longer as the force value increases. In FIG. 6, the force value of the press operation reaches the preset threshold, and the loading bar 201 is displayed at the preset length. Even if the press force is further increased, the loading bar 201 is still at the length as shown in FIG. 6. In addition, if the force value is decreased before the force value reaches the preset threshold during the pressing, then the loading bar 201 becomes shorter in response to the decreased force value.

The preset length is not limited in the embodiment of the present disclosure in terms of its specific value, which may be determined based on the size of the display interface of the display screen. For instance, as shown in FIG. 3 to FIG. 6, when the loading bar 201 is displayed laterally, the preset length of the loading bar 201 may be equal to the width of the display interface or slightly smaller than the width of the display interface.

In the embodiment of the present disclosure, as the force value increases, the way the loading bar 201 becomes longer is not limited.

As an implementation, when the force value is within the range of the preset thresholds, it is, in a functional relationship with the loading bar 201, for instance, in a proportional relationship. For instance, the preset length of the loading bar 201 is L cm, and the preset threshold of the force value is F N. A correspondence relationship between the length of the loading bar 201 and the force value may be that the length of the loading bar 201 is equal to the value of L/F multiplied by a current force value. Certainly, the force value may also be in other functional relationships with the loading bar 201, such as in a quadratic function, so that the loading bar 201 becomes longer constantly as the force value increases, and the loading bar 201 is increased to the preset length till the force value reaches the preset threshold.

As an implementation, the force value may also correspond to the loading bar 201 in manner of interval corresponding. For instance, when the force value is in a range of f1 to f2 Newton, the loading bar 201 has a length of 11 cm; when the force value is in a range of 12 to f3 Newton, the loading bar 201 has a length of 12 cm, and so on. When the force value reaches the preset threshold, the loading bar 201 is loaded to the preset length.

Figure 7:
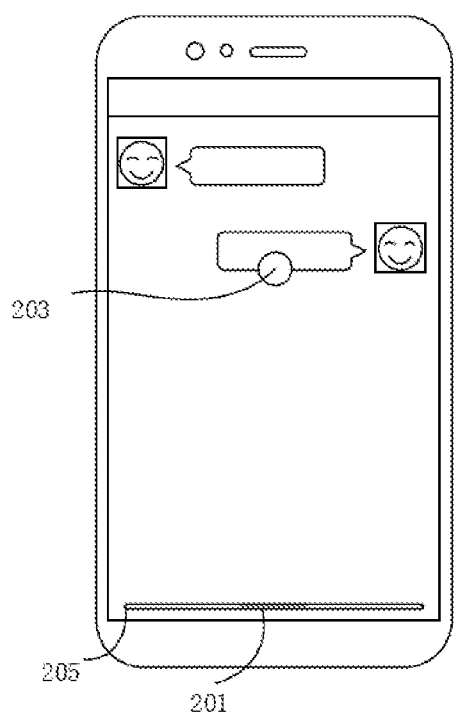
FIG. 7 shows the fifth display diagram according to an embodiment of the present disclosure.
Figure 8:
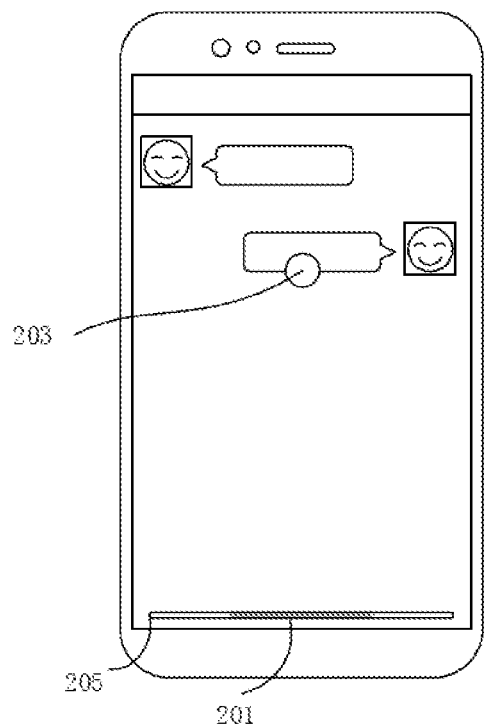
FIG. 8 shows the sixth display diagram according to an embodiment of the present disclosure.

In addition, as the press force increases, the loading bar 201 becomes longer, however, before the loading bar 201 reaches the preset length, the user may not know how much force is needed for the loading bar 201 to reach the preset length, or the user may not be able to determine if much press force is needed when the loading bar 201 has reached the preset length. Therefore, the embodiment of the present disclosure further provides an implementation. As shown in FIG. 7, when the loading bar 201 is displayed based on the press operation, a loading box 205 of a preset length can be simultaneously displayed, where the length of the loading box 205 indicates a length reached after the loading bar 201 is fully loaded. As the force value of the press operation increases, as shown in FIG. 8, the loading bar 201 becomes longer, and the filled length of the loading box 205 becomes longer, for feeding back to the user a distance from the loading bar 201 formed by the current press force to the fully loaded length, so that the user knows that they need to continue pressing.

Figure 9:
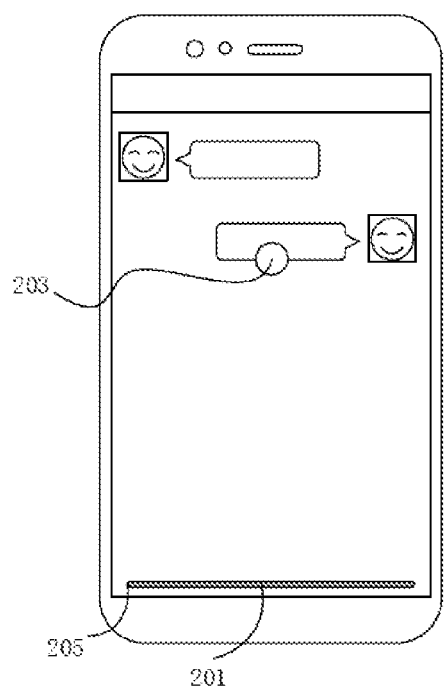
FIG. 9 shows the seventh display diagram according to an embodiment of the present disclosure.

When the force value of the press operation reaches the preset threshold, as shown in FIG. 9, the loading bar 201 is fully loaded to reach the preset length, and the loading box 205 is fully filled. The user can learn from the display of the loading bar 201 and the loading box 205 that the press force of the current press operation has reached a level to which the preset display content can be identified and parsed, and can stop the press operation.

When the force value of the press operation reaches the preset threshold, the loading bar 201 is loaded to the preset length, and the preset display content starts to be parsed. The parsing of the preset display content may include segmenting the preset display content, so that the user can perform a selected search for the segmentation result; if the preset display content includes a movie, a book, etc., the parsing of the preset display content may also include: getting product information in the preset display content, and providing detailed information such as a map, a third-party purchase link, a movie introduction, a book profile, an attractions brief, etc. The parsing of the preset display content may include various acquisitions of detailed information of the preset display content, which is not limited in the embodiment of the present disclosure.

In at least one embodiment, the user may not want to parse the currently pressed preset content any more during the pressing process before the force value of the pressing reaches the preset threshold, the press operation can be cancelled, and the parsing of the preset content can be disabled.

As an implementation, the user can cancel the press operation. If it is detected by the mobile terminal that the press operation is stopped in the case that the force value of the press operation has not reached the preset threshold, displaying the loading bar 201 is cancelled, and the parsing of the preset display content is disabled. If the press operation is detected again, the loading bar 201 representing a new press operation is displayed again when the press operation satisfies the preset condition.

Figure 10:
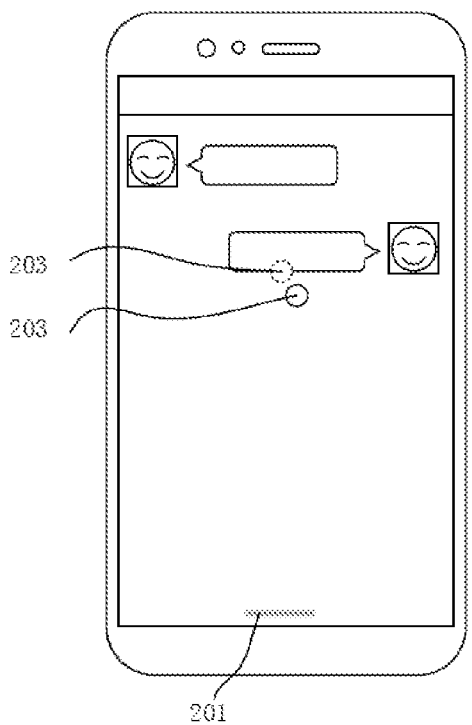
FIG. 10 shows the eighth display diagram according to an embodiment of the present disclosure.

As an implementation, the user can slide with the press position 203 of the press operation as a starting point. As shown in FIG. 10, the dotted circle represents the user's initial press position 203, and the solid circle represents the press position 203 after the user's sliding operation. A displacement for the press position 203 occurs. If it is detected by the mobile terminal that the press position 203 of the press operation has a displacement greater than a preset value, displaying the loading bar 201 is cancelled, and the parsing of the preset display content is disabled. The preset value is not limited in the embodiment of the present disclosure, which, for instance, may be 40 px (Pixel).

Step S250: displaying a parsed result.

After the parsing is successful, the parsed result for the preset display content can be displayed.

Figure 11:
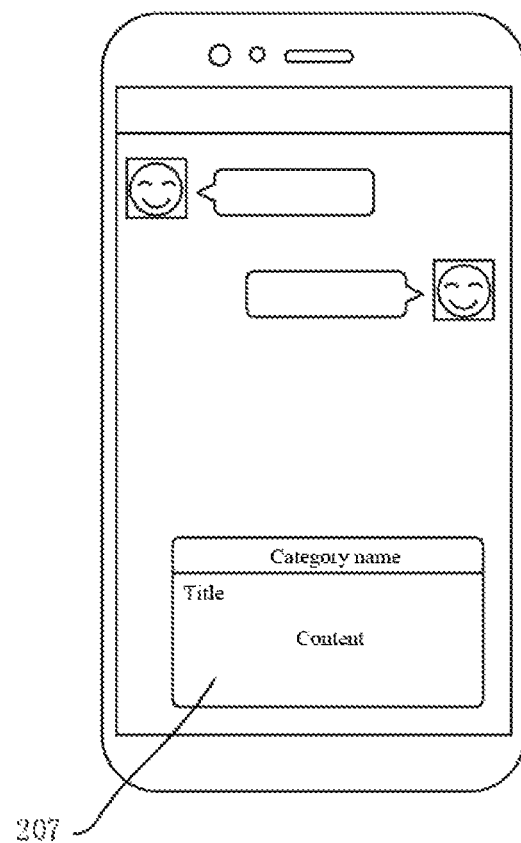
FIG. 11 shows the ninth display diagram according to an embodiment of the present disclosure.

As shown in FIG. 11, the parsed result may be displayed in a form of card 207. Upon completion of the parsing, the card loaded with the parsed result may pop up from the bottom of the display interface.

The parsed result may also be displayed in other ways. For instance, upon completion of the parsing, a mask is displayed on the display interface and the parsed result is displayed on the mask.

When the parsing is completed and the parsed result is displayed, the parsing process is fed back to the user through the parsed result that is displayed, and displaying the loading bar 201 can be cancelled.

In at least one embodiment, if the loading of the loading bar 201 is completed, the loading bar 201 can be blinked during the parsing process before the parsed result is obtained, so as to provide feedback to the user that the parsing is currently being performed.

In at least one embodiment, after the preset display content starts to be parsed, if the parsed result for the preset display content is not obtained within a preset duration, the parsing of the preset display content can be stopped, and displaying the loading bar 201 is cancelled. Moreover, information indicating that the parsing fails may also be fed back to the user, such as "identification failure", "connection to server failure", and the like. The preset duration may be a reasonable duration for which the user is willing to wait, or a possible duration indicating that it takes a relatively long time to parse the display content, such as 5 seconds.

In the embodiment of the present disclosure, in the case that the press operation satisfying the preset condition is received, the loading bar 201 representing the force value of the press operation is displayed. When the force value is gradually increased to the preset threshold, the loading bar 201 is fully loaded and displayed at the preset length. Moreover, the preset display content starts to be parsed. When the parsed result is obtained, the parsed result is displayed and displaying the loading bar 201 is cancelled to complete the identification of the preset display content. In the process of identifying and parsing the content, the loading bar 201 intuitively feeds back the user's touch, so that the user can intuitively observe the press force of the touch, thereby facilitating the user's in-time comprehension of feedback from the terminal for the touch and knowledge of the press process, and improving the user experience.

Figure 12:
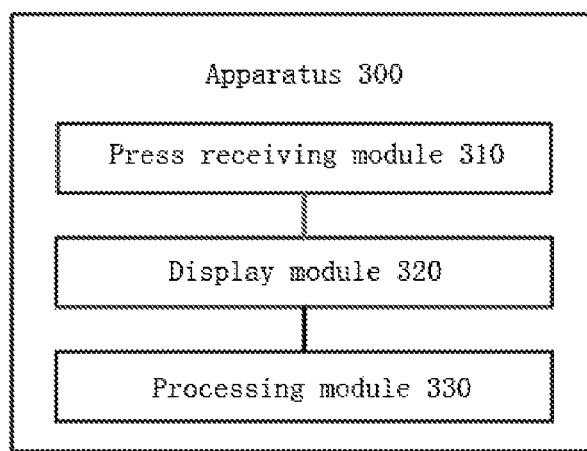
FIG. 12 shows a functional block diagram of an information display apparatus according to an embodiment of the present disclosure.

An embodiment of the present disclosure provides an information display apparatus 300. Reference may be made to FIG. 12. The apparatus 300 includes: a press receiving module 310, configured to receive a press operation on a preset display content; a display module 320, configured to display, based on the press operation, a loading bar 201, where the loading bar 201 is used for representing the magnitude of a force value of the press operation; and a processing module 330, configured to load the loading bar 201 to a preset length when the force value of the press operation reaches a preset threshold and parse the preset display content.

In the embodiment of the present disclosure, a determining module can be further included, which is configured to determine whether the force value of the press operation reaches an enabling force value. If so, the display module 320 is configured to display the loading bar 201.

In the embodiment of the present disclosure, a result display module can be further included, which is configured to display a parsed result. And the processing module can cancel displaying the loading bar 201 when the parsed result is displayed.

In at least one embodiment, before displaying the parsed result, the display module 320 can blink the loading bar 201.

In the embodiment of the present disclosure, a cancelling module can be further included, which is configured to, if the parsed result for the preset display content is not obtained within a preset duration, stop parsing the preset display content and cancel displaying the loading bar 201.

In at least one embodiment, the cancelling module can be configured to, when the force value of the press operation does not reach the preset threshold, if the press operation is stopped, cancel displaying the loading bar 201.

In at least one embodiment, the cancelling module can be configured to cancel displaying the loading bar 201 if a press position 203 of the press operation has a displacement greater than a preset value.

Figure 13:
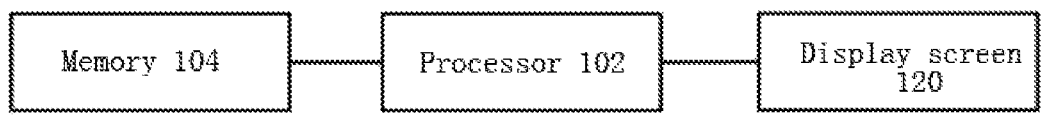
FIG. 13 shows a structural block diagram of a mobile terminal according to an embodiment of the present disclosure.

Reference may be made to FIG. 13 again. Based on the above information display method and apparatus, an embodiment of the present disclosure further provides a mobile terminal 400. As shown in FIG. 13, the mobile terminal 400 includes a display screen 120, a memory 104, and a processor 102. The display screen 120 and the memory 104 are coupled to the processor 102. The display screen 120 is configured to display a preset display content, a loading bar 201, a parsed result, etc. The memory 104 is configured to store instructions, and when the instructions are executed by the processor 102, the processor 102 performs the method provided in the embodiments of the present disclosure.

Figure 14:
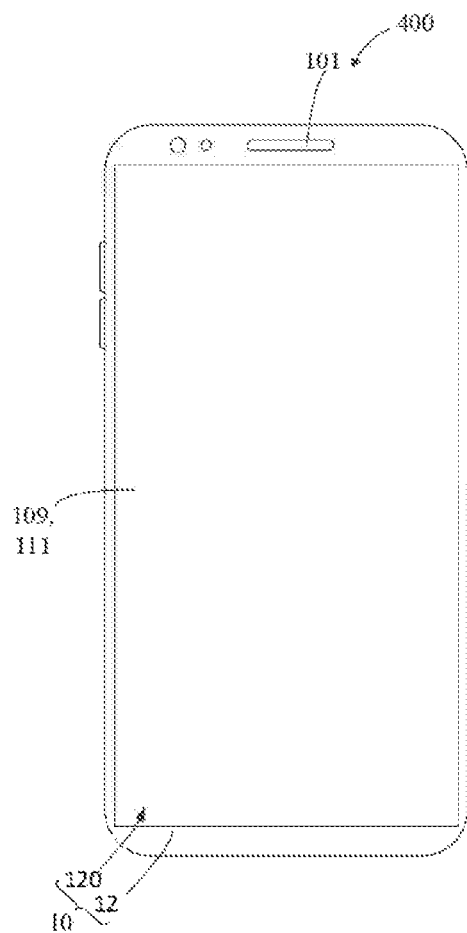
FIG. 14 shows a structural diagram of a mobile terminal according to an embodiment of the present disclosure.

Specifically, as shown in FIG. 14, the mobile terminal 400 can include an electronic body portion 10 including a housing 12 and the display screen 120 disposed thereon. The housing 12 may be made of metals such as steel or aluminum alloy. In this embodiment, the display screen 120 generally includes a display panel 111, and may also include a circuit for responding to a touch operation on the display panel 111, and the like. The display panel 111 may be a liquid crystal display (LCD). In some embodiments, the display panel 111 is also a touch screen 109.

Figure 15:
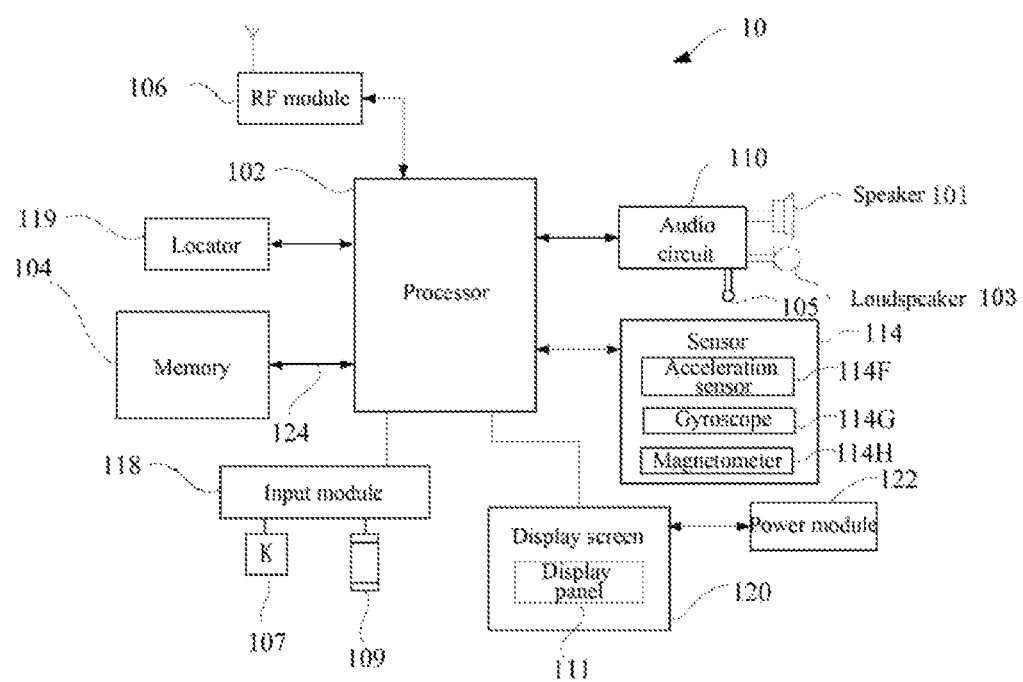
FIG. 15 shows a block diagram of a mobile terminal for performing an information display method according to an embodiment of the present disclosure.

Reference may be made to FIG. 15. In a practical application scenario, the mobile terminal 400 may be used as a smartphone terminal. In this case, the electronic body portion 10 usually further includes one or more (only one is shown in the drawing) processors 102, the memory 104, a radio frequency (RF) module 106, an audio circuit 110, a sensor 114, an input module 118, and a power module 122. Those skilled in the art will appreciate that the structure shown in FIG. 15 is merely illustrative and does not limit the structure of the electronic body portion 10. For instance, the electronic body portion 10 may also include more or fewer components than those shown in FIG. 15, or have a correspondence different from that shown in FIG. 15.

Those skilled in the art will appreciate that all other components are peripherals relative to the processor 102, and the processor 102 is coupled to the peripherals via a plurality of peripheral interfaces 124. The peripheral interfaces 124 may be implemented based on the following standards: universal asynchronous receiver/transmitter (DART), general purpose input output (GPIO), serial peripheral interface (SPI), inter-integrated circuit (I2C), but not limited to the above standards. In some examples, the peripheral interfaces 124 may include only a bus; in other examples, the peripheral interfaces 124 may also include other elements, for example, one or more controllers, such as a display controller for connection with the display panel 111 or a memory controller for connection with the memory. In addition, these controllers may also be detached from the peripheral interfaces 124, but integrated into the processor 102 or within a corresponding peripheral.

The memory 104 can be configured to store a software program and module. The processor 102 performs various functional applications and data processing by running the software program and module stored in the memory 104. The memory 104 may include a high speed random access memory and may also include a non-volatile memory such as one or more magnetic memory devices, flash memories, or other non-volatile solid state memories. In some examples, the memory 104 may further include memories remotely disposed relative to the processor 102, which are connected to the electronic body portion 10 or the display screen 120 via a network. Examples of such network include, but are not limited to, Internet, a corporate intranet, a local area network, a mobile communication network, and a combination thereof.

The RF module 106 is configured to receive and transmit an electromagnetic wave, and achieve a mutual conversion between the electromagnetic wave and an electrical signal, thereby communicating with a communication network or other devices. The RF module 106 may include various existing circuit elements for performing these functions, such as an antenna, a radio frequency transceiver, a digital signal processor, an encryption/decryption chip, a subscriber identity module (SIM) card, a memory, etc. The RF module 106 may communicate with various networks such as Internet, a corporate intranet, a wireless network, or communicate with other devices over a wireless network. The wireless network described above may include a cellular telephone network, a wireless local area network, or a metropolitan area network. The wireless network described above may use various communication standards, protocols and technologies, including but not limited to global system for mobile communication (GSM), enhanced data rates for GSM evolution (EDGE), wideband code division multiple access (W-CDMA), code division multiple access (CDMA), code division multiple access (CDMA), time division multiple access (TDMA), wireless fidelity (WiFi) (such as standards of the Institute of Electrical and Electronic Engineers, IEEE 802.10A, IEEE 802.11b, IEEE 802.11g and/or IEEE 802.11n), a voice over internet protocol (VoIP), worldwide interoperability for microwave access (Wi-Max), other protocols for mails, instant messaging and short messages, and any other suitable communication protocols, even those that have not been currently developed may be included.

The audio circuit 110, a speaker 101, a loudspeaker 103, and a microphone 105 collectively provide an audio interface between the user and the electronic body portion 10 or the display screen 120.

The sensor 114 is disposed within the electronic body portion 10 or within the display screen 120. Examples of the sensor 114 include, but are not limited to, an acceleration sensor 114F, a gyroscope 114G, a magnetometer 114H, and other sensors.

In this embodiment, the input module 118 can include the touch screen 109 disposed on the display screen 120. The touch screen 109 call be configured to collect a touch operation made by the user on or near the touch screen 109 (such as an operation made by the user using any proper object or attachment such as a finger, a stylus or the like, on or near the touch screen 109), so that the user's touch gesture can be obtained, and a corresponding connecting device is driven according to a preset program, therefore, the user can select a target area via the touch operation on the display screen. Alternatively, the touch screen 109 may include a touch detection apparatus and a touch controller. The touch detection apparatus is configured to detect a touch orientation of the user, detect a signal resulting from the touch operation, and transmit the signal to the touch controller. The touch controller is configured to receive touch information from the touch detection apparatus, convert the touch information into contact coordinates, and then transmit same to the processor 102, and the touch controller is also able to receive commands transmitted from the processor 102 and execute them. In addition, a touch detection function of the touch screen 109 may be implemented in various types such as resistive type, capacitive type, infrared, and surface acoustic waves. In addition to the touch screen 109, in other variant implementations, the input module 118 may also include other input devices, such as a key 107. The key 107 may include, for instance, character keys for inputting characters and control keys for triggering control functions. Examples of the control keys include a "return to home screen" key, a power on/off key, and the like.

The display screen 120 is configured to display information input by the user, information provided to the user, and various graphical user interfaces of the electronic body portion 10. These graphical user interfaces may be composed of graphics, text, icons, numbers, videos, and any combination thereof. In an example, the touch screen 109 may be disposed on the display panel 111 to form an integral part with the display panel 111.

The power module 122 is configured to provide power supply to the processor 102 and other components. Specifically, the power module 122 may include a power management system, one or more power sources (such as a battery or an alternating current), a charging circuit, a power failure detection circuit, an inverter, a power status indicator, and any other components pertaining to generation, management, and distribution of power within the electronic body portion 10 or the display screen 120.

The mobile terminal 400 also includes a locator 119 for determining an actual location at which the mobile terminal 400 is located. In this embodiment, the locator 119 uses a location service to achieve locating of the mobile terminal 400. The location service should be interpreted as a technology or a service to acquire location information (such as latitude and longitude coordinates) of the mobile terminal 400 using a specific locating technology, and mark the location of the located object on an electronic map.

It should be understood that the mobile terminal 400 described above is not limited to the smartphone terminal, and it should refer to a computer device that can be used in mobile. Specifically, the mobile terminal 400 refers to a mobile computer device equipped with a smart operating system, and the mobile terminal 400 includes, but is not limited to, a smart phone, a smart watch, a tablet, and the like.

It should be noted that various embodiments are described in the specification progressively, and each embodiment focuses on differences from other embodiments. For the same or similar part between embodiments, reference may be made to each other. For the apparatus embodiments, the description is relatively simple since they are basically similar to the method embodiments. Reference may be made to a partial description about the method embodiments for relevant parts. Any of the described processing manners in the method embodiments may be implemented in the apparatus embodiments by a corresponding processing module; and details will be omitted in the apparatus embodiments.

Any process or method description in the flow charts or otherwise described herein may be interpreted as a module, a segment or a portion representing instruction executable codes including one or more steps for implementing a particular logical function or process. Moreover, the scope of the preferred implementations of the present disclosure includes additional implementations in which the functions may be performed in a substantially simultaneous manner or in a reverse order depending on the functions involved, rather than in the order illustrated or discussed, which should be understood by those skilled in the art to which the embodiments of the present disclosure pertain.

The logic and/or steps represented in the flow charts or otherwise described herein, for example, may be considered as an ordered list of executable instructions for implementing logical functions, which may be embodied in any computer readable medium for use with instruction executable systems, apparatuses or devices (such as computer-based systems, systems including processors, or other systems that can fetch and execute instructions from the instruction execution systems, apparatuses, or devices), or for use in conjunction with these instruction executable systems, apparatuses or devices. With regard to the specification, the "computer readable medium" may be any apparatus that may contain, store, communicate, propagate, or transport a program for use with the instruction executable systems, apparatuses or devices, or for use in conjunction with these instruction executable systems, apparatuses or devices. More specific examples (a non-exhaustive list) of the computer readable media include: an electrical connection portion (a mobile terminal) having one or more wires, a portable computer diskette (a magnetic device), a random access memory (RAM), a read only memory (ROM), an erasable programmable read only memory (EPROM or a flash memory), a fiber optic device, and a portable compact disk read only memory (CDROM). In addition, the computer readable medium even may be a paper or other suitable mediums on which the program can be printed, since the program can be derived electronically, for example, by optically scanning, the paper or other mediums, followed by editing, decoding, or processing otherwise properly if appropriate, and then storing the program in a computer memory.

It should be understood that each portion of the present disclosure may be implemented in hardware, software, firmware, or a combination thereof. In the above-described embodiments, a plurality of steps or methods may be implemented with software or firmware stored in a memory and executed by a suitable instruction executable system. For example, if the steps or methods are implemented in hardware, as in another embodiment, they can be implemented by any one of or a combination of the following techniques well known in the art: a discrete logic circuit having a logic gate circuit for implementing logic functions on data signals, an application specific integrated circuit with suitable combinational logic gate circuits, a programmable gate array (PGA), a field programmable gate array (FPGA), etc.

Those skilled in the art will appreciate that all or a part of the steps carried in the above method embodiments may be implemented by a program instructing related hardware. The program may be stored in a computer readable storage medium. When executed, the program includes one or a combination of the steps of the method embodiments. In addition, functional units in the embodiments of the present disclosure may be integrated into one processing module, or each of the units may exist alone physically, or two or more than two units may be integrated into one module. The above integrated module may be implemented in a form of hardware or in a form of software functional module. If the integrated module is implemented in the form of software functional module and sold or used as a separate product, it may also be stored in a computer readable storage medium.

The storage medium mentioned above may be a read only memory, a magnetic disk or an optical disk or the like. Although the embodiments of the present disclosure have been illustrated and described above, it will appreciate that the foregoing embodiments are illustrative, but cannot be construed as limiting the present disclosure. Those skilled in the art may make modifications, amendments, substitutions and variations to the above embodiments within the scope of the present disclosure.

Finally, it should be noted that the foregoing embodiments are merely intended for describing the technical solution of the present disclosure rather than limiting the present disclosure. Although the present disclosure has been described in detail with reference to the foregoing embodiments, those skilled in the art should understand that they may still make modifications to the technical solution described in the foregoing embodiments, or make equivalent replacements to some technical features therein; however, these modifications or replacements do not make the essence of the corresponding technical solution depart from the spirit and scope of the technical solutions in the embodiments of the present disclosure.

What is claimed is:

1. An information display method, comprising:
   receiving, by a processor, a press operation on a preset display content;
   displaying, by a display screen and based on the press operation, a loading bar representing a magnitude of a force value of the press operation;
   loading, by the processor, the loading bar to a preset length when the force value of the press operation reaches a preset threshold; and
   identifying and executing, by the processor, the preset display content;
   wherein the method further comprises stopping identifying and executing the preset display content and cancelling displaying the loading bar when an identified and executed result for the preset display content is not obtained within a preset duration due to a failure from identifying and executing the preset display content; and
   wherein the preset display content is a webpage content, a video content, a chat content, or a picture content.

2. The method of claim 1, further comprising:
   displaying the identified and executed result and cancelling displaying the loading bar.

3. The method of claim 2, further comprising:
   blinking the loading bar before displaying the identified and executed result.

4. The method of claim 1, further comprising:
   cancelling displaying the loading bar when the force value of the press operation does not reach the preset threshold and the press operation is stopped.

5. The method of claim 1, further comprising:
   cancelling displaying the loading bar when a press position of the press operation has a displacement greater than a preset value.

6. The method of claim 1, further comprising:
   determining whether the force value of the press operation reaches an enabling force value; and displaying the loading bar in response to determining that the force value of the press operation reaches the enabling force value.

7. A mobile terminal, comprising: a display screen, a memory and a processor, wherein the display screen and the memory are coupled to the processor, the memory is configured to store instructions, and the instructions are executed by the processor, the processor is configured to:
receive a press operation on a preset display content;
display, based on the press operation, a loading bar representing a magnitude of a force value of the press operation;
load the loading bar to a preset length when the force value of the press operation reaches a preset threshold; and
identify and execute the preset display content;
wherein the processor is further configured to: stop identifying and executing the preset display content and cancelling displaying the loading bar when an identified and executed result for the preset display content is not obtained within a preset duration due to a failure from identifying and executing the preset display content; and
wherein the preset display content is a webpage content, a video content, a chat content, or a picture content.

8. The mobile terminal of claim 7, wherein the processor is further configured to display the identified and executed result and cancel displaying the loading bar.

9. The mobile terminal of claim 8, wherein the processor is further configured to blink the loading bar.

10. The mobile terminal of claim 7, wherein the processor is further configured to:
cancel displaying the loading bar when the force value of the press operation does not reach the preset threshold and the press operation is stopped.

11. The mobile terminal of claim 7, wherein the processor is further configured to:
cancel displaying the loading bar when a press position of the press operation has a displacement greater than a preset value.

12. The mobile terminal of claim 7, wherein the processor is further configured to:
determine whether the force value of the press operation reaches an enabling force value before displaying the loading bar; and
display the loading bar in response to determining that the force value of the press operation reaches the enabling force value.

13. A non-transitory computer-readable medium storing computer-executable code for information display, the code executable by a processor to:
receive a press operation on a preset display content;
display, based on the press operation, a loading bar representing a magnitude of a force value of the press operation;
load the loading bar to a preset length when the force value of the press operation reaches a preset threshold; and
identify and execute the preset display content;
wherein the code executable by the processor further to stop identifying and executing the preset display content and cancel displaying the loading bar when an identified and executed result for the preset display content is not obtained within a preset duration due to a failure from identifying and executing the preset display content; and
wherein the preset display content is a webpage content, a video content, a chat content, or a picture content.

14. The non-transitory computer-readable medium of claim 13, further storing the code executable by the processor to display the identified and executed result and cancel displaying the loading bar.

15. The non-transitory computer-readable medium of claim 14, further storing the code executable by the processor to blink the loading bar.

16. The non-transitory computer-readable medium of claim 13, further storing the code executable by the processor to cancel displaying the loading bar when the force value of the press operation does not reach the preset threshold and the press operation is stopped.

17. The non-transitory computer-readable medium of claim 13, further storing the code executable by the processor to cancel displaying the loading bar when a press position of the press operation has a displacement greater than a preset value.

* * * * *